United States Patent Office 3,646,179
Patented Feb. 29, 1972

3,646,179
PROCESS FOR PREPARING HIGH PRESSURE CELLULOSE ACETATE SEMIPERMEABLE MEMBRANES
Regis R. Stana, Pittsburgh, Pa., assignor to Westinghouse Electric Corporation, Pittsburgh, Pa.
Filed May 22, 1969, Ser. No. 827,014
Int. Cl. B29d 27/04; C08b 17/36, 21/04
U.S. Cl. 264—41  6 Claims

ABSTRACT OF THE DISCLOSURE

A high strength semipermeable membrane, consisting of a supportive layer and an osmotic skin layer of dense polymeric cellulosic material, is made by (1) mixing polymeric film forming cellulosic material, ethyl acetate and additives such as swelling additives to form a casting solution (2) casting a film from the solution (3) drying the film (4) leaching the film to form a semipermeable membrane and (5) optionally curing the membrane in hot water.

BACKGROUND OF THE INVENTION

Cellulose acetate semipermeable membranes have been used in the reverse osmosis method of water purification. The preparation of these membranes by incorporating aqueous magnesium perchlorate, formamide, etc. in an acetone solution of cellulose acetate is well known. Modifications of the original cellulose acetate membrane have since been made. One such modification is described in U.S. Ser. No. 824,115, filed May 13, 1969 and assigned to the assignee of this invention, wherein a glycerol ester lipid is incorporated in the membrane casting solution and the finished membrane. The heretofore known acetone based casting solutions provide membranes having good purified water flux and impurity rejection results. For this reason acetone has been used almost exclusively as the standard solvent for reverse osmosis membrane casting solutions.

The tensile strength of each of these acetone-cellulose acetate membranes, when wet, is in the order of 350 to 550 p.s.i. A quarter inch diameter unsupported membrane tube, with a 10 mil wall thickness, would burst with an internal pressure of about 28 to 44 p.s.i. Such a pressure is too low for carrying on an economical reverse osmosis process in an unsupported cellulose acetate tube. Of course, the bursting pressure could be improved by making the walls thicker or reducing the membrane diameter, but each of these have their manufacturing drawbacks and problems. It would of course be extremely advantageous in terms of cost, if a high strength self-supporting membrane for reverse osmosis systems could be developed.

SUMMARY OF THE INVENTION

Accordingly, it is the object of this invention to provide improved high strength reverse osmosis semipermeable membranes, for use in tubular or other type reverse osmosis systems.

It is another object of this invention to provide a new and improved method for fabricating these membranes using ethyl acetate in the solvent in the membrane casting solution.

Briefly, these objects are accomplished by (1) using the solvent ethyl acetate in reverse osmosis membrane casting solutions (2) casting the solution to form a film (3) drying the film and (4) leaching the film to form a semipermeable reverse osmosis membrane capable of sustained high pressure operation.

Many solvents have been used in reverse osmosis membrane casting solutions but acetone has become the standard solvent. The use of ethyl acetate in membrane casting solutions, however, gives the improved and unexpected result of enabling the production of membranes having tensile strengths in the order of 850 p.s.i.

BRIEF DESCRIPTION OF THE DRAWINGS

For a better understanding of the nature and objects of the invention, reference may be made to the following drawings in which.

DESCRIPTION OF THE PREFERRED EMBODIMENTS

Figure 1:
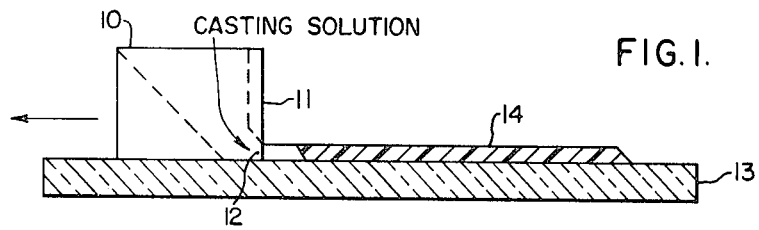
FIG. 1 is a cross sectional illustration of the casting apparatus used in the experiments.

Osmosis occurs when two solutions of different concentrations in the same solvent are separated from one another by a semipermeable membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process. A detailed analysis of this phenomena can be found in U. Merten, Desalination By Reverse Osmosis, M.I.T. Press, 1966.

An interesting peculiarity of semipermeable cellulose acetate reverse osmosis membranes, is that they will only reject salt, or other solute impurities, if the osmotic skin side of the membrane is in contact with the contaminated feed. The cellulose acetate osmotic skin side of the membrane is extremely thin, about 0.2 micron, and has minute passageways through it. It is very dense and is the side that is effective in holding back the dissolved impurities in the feed. The remainder of the membrane structure is a spongy porous cellulose acetate sublayer material that accounts for about 99.8% of the membrane's thickness. Its function is mainly supportive.

In the method of my invention a polymeric film forming cellulosic material, such as a cellulose ether or a cellulose ester, is dissolved in a volatile solution. This volatile solution must contain the solvent ethyl acetate to improve membrane toughness and swelling additives capable of causing the structural organization of a dense osmotic skin from the cellulosic ether or ester. The solution may contain other additives or ingredients to improve either purified water flux or impurity rejection of the final membranes. This casting solution is then cast as a film in flat or cylindrical form and a portion of the casting solution is allowed to evaporate, causing a dense osmotic skin to develop at the air-solution interface.

The cast film is then immersed in a leaching bath containing a leaching solvent such as alcohol or water, where the ethyl acetate and swelling additive pass through the osmotic skin into the leaching bath and the water from the bath passes into the membrane. The semipermeable membrane may then be cured, generally in hot water, causing the cellulose acetate to shrink, presumably reducing the size of the passageways through the osmotic skin and allowing the molecules to align themselves in a regular pattern so as to give the lining of the passageways a negative charge. Feed water containing dissolved solids is applied to the high density osmotic skin side of the semi-permeable membrane under pressure, and purified water is recovered from the opposite side.

In order to produce high pressure membranes having a wet tensile strength in the range of 850 p.s.i. ethyl acetate is used as a solvent in the casting solution. The exact reason that is particular solvent gives such an improvement in membrane toughness is not known. The membranes made from casting solutions containing ethyl acetate, were opaque after air drying and were much stronger than membranes made from solutions using acetone as the solvent. The ethyl acetate casting solution also had a unique property in that it remained clear even after six months of refrigerator storage. All acetone solvent, cellulose acetate casting solutions turn dark within a few days and are almost black in two months. This is believed due to the degradation of one of the components. The identity of the degraded component has not been established but formamide decomposition is believed to be most likely.

The polymeric film forming cellulose ether or ester that can be used in the casting solution, in combination with the ethyl acetate and swelling additive, can be selected from film forming materials such as cellulose acetate, cellulose acetate-butyrate, cellulose propionate and ethyl cellulose.

The preparation of such materials is well known in the art. Cellulose acetate, the preferred polymeric film-forming cellulosic material, can be prepared by first converting cellulose into the triacetate in the presence of acetic anhydride, acetic acid and sulfuric acid. Partial hydrolysis removes some of the acetate groups, degrades the chains to smaller fragments (of 200–300 units each) and yields cellulose acetate. A detailed description of the preparation and structures of the cellulose esters and cellulose ethers can be found in Brydson, Plastics Materials, D. Van Nostrand, pp. 356–376, (1966).

The pore producing swelling additive, is one which is compatible with and will not dissolve the cellulose acetate. It can be selected from swelling additives such as formamide (methanamide) $HCONH_2$, triethylphosphate, tertrahydrofuryl phosphate and aqueous magnesium perchlorate.

In one preferred embodiment of this invention, impurity rejection may be improved by adding glycerol ester lipids to the casting solution. These lipids have the general formula

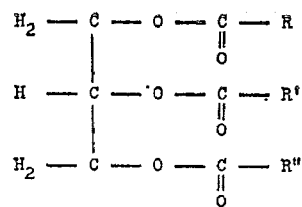

where R, R' and R'' are alkyl groups containing 1 to 20 carbons and preferably 1 to 8 carbons. The preferred glycerol ester lipid is triacetin (triacetate glycerol). These lipids are well known and further details on their composition and synthesis can be found in Gilman, Organic Chemistry An Advanced Treatise, John Wiley & Sons, vol. 3, chapter 3, 1953 and Fieser and Fieser, Advanced Organic Chemistry, Reinhold Pub., chapter 30, 1961.

The experimental equipment consisted of a film sheet casting apparatus, film tube casting apparatus, a leaching bath, a high pressure test loop for testing either tubular or flat membranes and a tap water test loop using the tap water line pressure.

The film membrane casting apparatus used in the examples is shown in FIG. 1, and consisted of a hollow container 10 into which the casting solution was poured. One side of this container had a blade 11 which adjusted the height of a hole 12 extending along the length of the container. The casting solution flowed through the hole and onto a glass plate 13, as the container was moved as shown, to form the cast film 14. The leaching bath consisted of a bottom tank where an ice water mixture was kept, and a pair of top water trays to which the ice water from the bottom tank was constantly circulated. The film tube casting apparatus was designed to be able to cast four foot long tubes and at the same time be able to control the casting rate, membrane thickness, air dry time, flow of leaching water past the membrane and leaching time. The high pressure loop used a Moyno pump that could provide up to 2 gallons per minute at pressures up to 500 p.s.i.g. Feed water for this system consisted of 5000 p.p.m. sodium chloride solution. The tap water loop used laboratory tap water at 70–80 p.s.i.g. and 100–200 p.p.m. (parts per million) dissolved solids as a feed.

Figure 2:
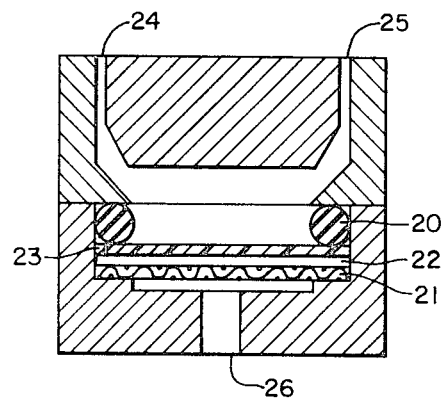
FIG. 2 is a cross sectional illustration of one of the reverse osmosis cells used in determining flux and rejection rates of the high pressure semipermeable membranes of this invention.
Figure 3:
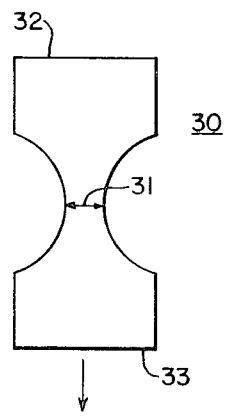
FIG. 3 is a schematic drawing showing how the tensile strength of membranes were tested in the examples.

The reverse osmosis cells used for testing flat membranes were of the standard type, and used Type 304 stainless steel or Plexiglas as construction materials. Round cells were used for testing 1.0 to 2.0 inch diameter flat membranes. This cell, used in Example 1, is shown in FIG. 2. The feed water side seal is made with a rubber "O" ring 20. The product side collection consisted of fine stainless steel wire cloth 21 covered with 2 layers of paper 22, with the paper contacting the cast semipermeable membrane 23. Feed water is fed in opening 24, which is angled to distribute the feed water against the osmotic skin side of the semipermeable membrane and out opening 25. Purified water is removed through opening 26 behind the semipermeable membrane. The tensile strength of cellulose acetate reverse osmosis membranes were measured in the examples in the following manner: Membrane samples were cut to a shape similar to that shown in FIG. 3 of the drawings. The thickness of the cast membrane sample, T, and the minimum width of the sample sides, W, shown as width 31 in the drawings, was measured. Typical values were T=0.006" and W=0.250". After a sample 30 was cut, a binder clip was clamped to each end. End 32 was hung on a stationary object while weights were attached to end 33. When the sample broke, the weight necessary to cause the break, $wt$, was noted. From this data the tensile strength of the sample was calculated using the formula:

Tensile strength=$wt/(T)(W)$

EXAMPLE 1

A casting solution was prepared having the following composition:

4.5 oz. (20.8 wt. percent)—cellulose acetate
10.0 oz. (46.3 wt. percent)—ethyl acetate
7.0 oz. (32.5 wt. percent)—formamide (methanamide)
2.0 ml. (.4 wt. percent)—triacetin (triacetateglycerol)

The solid cellulose acetate was added to the other liquid ingredients to give a viscous liquid solution. This viscous casting solution was poured into the film casting apparatus heretofore described and illustrated in FIG. 1 of the drawings, containing a blade with an opening of 6 mils at the bottom of one side of the container. The casting apparatus was 1 foot long and it was hand drawn across a 1′ x 1′ glass plate in 5 seconds to give a casting about 10″ x 12″. The liquid solution poured through the opening in the casting apparatus during this time to form a film on the glass plate. The casting was allowed to air dry for another 5 seconds to give an air dry time of about 10 seconds. The glass plate and casting apparatus were at room temperature. No effort was made to increase the normal laboratory air circulation during the air dry time. The glass plate with the casting was then immersed in a leaching bath, at 32° F., prepared from a mixture of tap water and crushed ice. After 20 minutes, the semipermeable membrane casting, about 5 mils thick and having an osmotic skin layer, was separated from the glass plate. A small sample 1.75″ diameter was cut out of the uncured semipermeable membrane.

This sample was mounted in the standard stainless reverse osmosis cell heretofore described and illustrated in FIG. 2 of the drawings, with the osmotic skin side of the membrane facing the feed water entrance. Tap water containing 150 p.p.m. (parts per million) dissolved solids was fed into the reverse osmosis cell at 80 p.s.i. The uncured semipermeable membrane operated at 79% rejection of undissolved solids with a purified water flux of 1.9 gal./sq. ft.-day. The salt rejecting property of this membrane can be improved by curing it in hot water at a temperature of about 150–190° F. The same membrane is also capable of a much higher water flux at about 30% rejection. Increased rejection and flux could be anticipated if the casting solution composition were optimized.

The tensile strength of this high strength ethyl-acetate-cellulose acetate membrane was measured using the aforedescribed technique. A sample 2.5″ x 1″ was cut from the uncured semipermeable membrane casting. Part of the sides were cut out to give a shape similar to that shown in FIG. 3 of the drawings. The thickness of the uncured membrane and the minimum width were measured with a micrometer. During the process of cutting and measuring the membrane sample, it was kept wet by frequent dipping in water. A binder clip was attached to each end of the sample. One end was attached to a stationary support. To the other end, weights were added in increments. The thickness of the cast membrane sample was 0.005 in., the minimum width of the sample was 0.250 in. and the weight necessary to break the sample was 1.062 lbs.

The tensile strength of the sample was calculated to be (1.062 lb.)/(.005)(.250)(sq. in.)=850 p.s.i.

EXAMPLE 2

Two other semipermeable reverse osmosis membranes were prepared from casting solutions having the following compositions:

SOLUTION A 5 oz. (25.0 wt. percent)—cellulose acetate
9 oz. (45.0 wt. percent)—acetone
6 oz. (30.0 wt. percent)—formamide (methanamide)

SOLUTION B 5 oz. (23.6 wt. percent)—cellulose acetate
10 oz. (47.4 wt. percent)—acetone
6 oz. (28.4 wt. percent)—formamide (methanamide)
5 ml. (.6 wt. percent)—triacetin (triacetateglycerol)

This example will illustrate the superior tensile strength of the ethyl acetate membranes of Example 1.

The solid cellulose acetate was added in both cases to the other liquid ingredients to give a viscous liquid casting solution. The film casting apparatus used for Solution A had an opening of about 8 mils and the apparatus used for Solution B has an opening of about 12 mils. The films were cast and leached using the procedure and techniques of Example 1. The resulting semipermeable membranes were uncured and had an air dry time of about 10 seconds.

The tensile strength of the membranes prepared from Solutions A and B were tested using the procedure and techniques of Example 1.

The Solution A cast membrane sample was 0.007 in. thick, it had a minimum width of 0.238 in. and the weight necessary to break the sample was 0.938 lb. The tensile strength o fthe same was calculated to be (1.125 lb.)/(.007)(.238)(sq. in.)=562 p.s.i.

The Solution B cast membrane sample was 0.010 in. thick, it had a minimum width of 0.256 in. and the weight necessary to break the sample was 1.125 lb. The tensile strength of the sample was calculated to be (1.125 lb.)/(.010)(.256)(sq. in.)=440 p.s.i.

Repeated tests with samples of the same composition showed the tensile strength results to vary no more than ±10% of the values given in the examples.

As can be seen there is a substantial improvement in tensile strength, where ethyl acetate is used as the casting solution solvent. This improvement in tensile strength will allow fabrication of more dependable high pressure membranes, that will be able to operate at higher pressures in unsupported form.

I claim as my invention:

1. A process for the preparation of high strength semipermeable membranes comprising the steps of:
    (A) admixing
        (i) a polymeric film forming cellulosic material selected from the group consisting of cellulose esters and cellulose ethers,
        (ii) ethyl acetate as a solvent, and
        (iii) a swelling additive selected from the group consisting of formamide, triethyl phosphate, tetrahydrofuryl phosphate and aqueous magnesium perchlorate to form a casting solution,
    (B) casting a film of said solution,
    (C) allowing a portion of said solvent to evaporate, and finally
    (D) leaching said film by immersion in a bath of leaching solvent selected from the group consisting of alcohol and water to form a semipermeable membrane.

2. The process of claim 1 wherein the polymeric film forming cellulosic material is selected from the group consisting of cellulose acetate, cellulose acetate-butyrate, cellulose propionate and ethyl cellulose.

3. The process of claim 1 wherein the swelling additive is formamide.

4. The process of claim 1 wherein the casting solution also contains a glycerol ester lipid having the formula

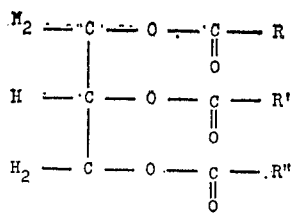

wherein R, R' and R" are alkyl groups containing 1-8 carbons.

5. The process of claim 4 wherein the glycerol ester lipid is triacetin.

6. The process of claim 4 where as a final step the membrane is cured in hot water.

References Cited
UNITED STATES PATENTS

| | | | |
|---|---|---|---|
| 3,567,809 | 3/1971 | Ueno et al. | 264—41 |
| 2,591,077 | 4/1952 | Lamborn | 106—196 |
| 2,925,352 | 2/1960 | Lowe | 106—181 |
| 3,364,288 | 1/1968 | Loeb | 264—49 |
| 3,412,184 | 11/1968 | Sharples et al. | 264—41 X |
| 3,432,584 | 3/1969 | Cannon et al. | 264—41 X |
| 3,494,780 | 2/1970 | Skiens | 264—41 X |

OTHER REFERENCES

U.S. Office of Saline Water, "The Mechanism of Desalination by Reverse Osmosis" by Dr. B. Keilin, Aerojet-General Corp., Research and Development Progress Report No. 117, August 1964, pp. 34, 35 and Table 19, copy: 264-41.

PHILIP E. ANDERSON, Primary Examiner

U.S. Cl. X.R.

106—181, 196; 210—500; 264—217